US010616551B2

(12) United States Patent
Watson et al.

(10) Patent No.: US 10,616,551 B2
(45) Date of Patent: Apr. 7, 2020

(54) METHOD AND SYSTEM FOR CONSTRUCTING VIEW FROM MULTIPLE VIDEO STREAMS

(71) Applicant: OrbViu Inc., San Mateo, CA (US)

(72) Inventors: Brian Michael Christopher Watson, Groveland, CA (US); Crusoe Xiaodong Mao, Hillsborough, CA (US); Jiandong Shen, Cupertino, CA (US); Frederick William Umminger, III, Oakland, CA (US)

(73) Assignee: OrbViu Inc., San Mateo, CA (US)

( * ) Notice: Subject to any disclaimer, the term of this patent is extended or adjusted under 35 U.S.C. 154(b) by 43 days.

(21) Appl. No.: 15/881,608

(22) Filed: Jan. 26, 2018

(65) Prior Publication Data

US 2018/0220120 A1    Aug. 2, 2018

Related U.S. Application Data

(60) Provisional application No. 62/451,649, filed on Jan. 27, 2017.

(51) Int. Cl.
| | |
|---|---|
| *H04N 13/161* | (2018.01) |
| *H04N 13/117* | (2018.01) |
| *H04N 13/139* | (2018.01) |
| *H04N 13/167* | (2018.01) |
| *H04N 13/194* | (2018.01) |
| *H04N 13/178* | (2018.01) |
| *H04N 21/81* | (2011.01) |
| *H04N 21/2343* | (2011.01) |

(52) U.S. Cl.
CPC ......... *H04N 13/161* (2018.05); *H04N 13/117* (2018.05); *H04N 13/139* (2018.05); *H04N 13/167* (2018.05); *H04N 13/178* (2018.05); *H04N 13/194* (2018.05); *H04N 21/23439* (2013.01); *H04N 21/816* (2013.01)

(58) Field of Classification Search
CPC .. H04N 13/117; H04N 13/139; H04N 13/161; H04N 13/167; H04N 13/178; H04N 13/194; H04N 21/23439; H04N 21/816
See application file for complete search history.

(56) References Cited

U.S. PATENT DOCUMENTS

| | | | | |
|---|---|---|---|---|
| 6,055,274 | A * | 4/2000 | McVeigh | H04N 19/597 375/240.16 |
| 6,118,475 | A * | 9/2000 | Iijima | G01C 11/06 348/42 |
| 6,567,086 | B1 | 5/2003 | Hashimoto | |
| 8,633,962 | B2 | 1/2014 | King et al. | |
| 9,246,856 | B1 | 1/2016 | Pan et al. | |

(Continued)

*Primary Examiner* — Peter D Le
(74) *Attorney, Agent, or Firm* — Kanika Radhakrishnan; Evergreen Valley Law Group

(57) ABSTRACT

A method and system for constructing view from multiple video streams is provided. The method includes receiving a view independent stream. The method further includes selecting a first view dependent stream, wherein the view independent stream and the first view dependent stream has at least one different geometry. The method also includes generating end user views corresponding to the view independent stream and the first view dependent stream. Further, the method includes blending the end user views to generate a view for display.

18 Claims, 12 Drawing Sheets

(56) References Cited

U.S. PATENT DOCUMENTS

| | | | |
|---|---|---|---|
| 2007/0103558 A1 | 5/2007 | Cai et al. | |
| 2007/0229530 A1* | 10/2007 | Marshall | G06T 11/001 345/587 |
| 2009/0142041 A1* | 6/2009 | Nagasawa | H04N 19/70 348/42 |
| 2010/0086285 A1* | 4/2010 | Sasaki | G11B 27/105 386/212 |
| 2010/0141738 A1* | 6/2010 | Lee | H04H 20/57 348/43 |
| 2010/0272417 A1* | 10/2010 | Nagasawa | H04N 19/597 386/341 |
| 2010/0290483 A1* | 11/2010 | Park | H04N 21/235 370/472 |
| 2010/0293173 A1* | 11/2010 | Chapin | G06Q 30/02 707/759 |
| 2011/0085779 A1* | 4/2011 | Hattori | G11B 27/105 386/240 |
| 2012/0229603 A1* | 9/2012 | Bruls | H04N 19/597 348/43 |
| 2012/0249586 A1* | 10/2012 | Wither | H04N 1/00323 345/633 |
| 2013/0176384 A1* | 7/2013 | Jones | H04N 5/23238 348/36 |
| 2013/0222369 A1* | 8/2013 | Huston | G06T 17/00 345/419 |
| 2014/0218474 A1* | 8/2014 | Hong | H04N 21/234327 348/43 |
| 2014/0218612 A1 | 8/2014 | Belsarkar | |
| 2014/0306963 A1* | 10/2014 | Sun | H04N 13/302 345/427 |
| 2015/0179226 A1 | 6/2015 | Willard et al. | |
| 2015/0195611 A1* | 7/2015 | Kim | H04N 21/21805 725/116 |
| 2015/0229840 A1* | 8/2015 | Sawai | G06T 3/4038 348/36 |
| 2017/0323423 A1* | 11/2017 | Lin | H04N 13/139 |
| 2018/0063440 A1* | 3/2018 | Kopf | H04N 5/23267 |

\* cited by examiner

| | IMAGE ENCODING TYPE | WIDTH | HEIGHT | FRAME RATE | TOTAL PIXELS/SEC |
|---|---|---|---|---|---|
| 714 | TRADITIONAL EQUIRECTANGULAR | 3840 | 2160 | 30FPS | 248,832,000 |
| 716 | BACKGROUND STREAM | 3840 | 1920 | 1FPS | 7,372,800 |
| 718 | FOREGROUND STREAM | 1440 | 1440 | 30FPS | 62,208,000 |
| | | | | TOTAL | 69,580,800 |

722 — NUMBER OF PIXELS DECODED USING TRADITIONAL METHOD 726

724 — NUMBER OF PIXELS DECODED USING PROPOSED METHOD 728

FIG. 7

| LAYER | VIEW | META-DATA |
|---|---|---|
| 0 | <NONE> | NONE |
| 1 | 0,0,0 | YAW=0, PITCH=0, ROLL=0 |
| 1 | 0,30,0 | YAW=0, PITCH=30, ROLL=0 |
| 1 | 0,60,0 | YAW=0, PITCH=60, ROLL=0 |
| 1 | 0,-30,0 | YAW=0, PITCH=-30, ROLL=0 |

FIG. 12

METHOD AND SYSTEM FOR CONSTRUCTING VIEW FROM MULTIPLE VIDEO STREAMS

TECHNICAL FIELD

The present disclosure relates to a method and a system for constructing view from multiple streams and, more particularly, to a method and system for constructing view from multiple streams of a 360-degree video.

BACKGROUND

In a typical video processing scenario, a video is first encoded to reduce consumption of bandwidth during transfer of the video. The encoded video is then streamed in form of multiple streams to a client. The multiple streams are processed at client end to construct view from multiple streams. The multiple streams may have different properties such as frame rate, geometries etc., and hence it becomes challenging to construct views from such streams without compromising on quality and bandwidth. With use of 360-degree video, the storage and processing requirements increase many folds and therefore, there is a need for a method and a system for constructing view from multiple streams in an efficient manner.

SUMMARY

Various embodiments of the present disclosure provide systems and methods for constructing view from multiple video streams.

A method for constructing view from multiple video streams at a client device of a user is provided. The method includes receiving a view independent stream. The method further includes selecting a first view dependent stream, wherein the view independent stream and the first view dependent stream has at least one different geometry. The method also includes generating end user views corresponding to the view independent stream and the first view dependent stream. Further, the method includes blending the end user views to generate a view for display.

A system for constructing view from multiple video streams is provided. The system includes a receiver to receive a view independent stream. The system also includes a selector to select a first view dependent stream, wherein the view independent stream and the first view dependent stream has at least one different geometry. The system further includes a view generator to generate end user views corresponding to the view independent stream and the first view dependent stream. Further, the system includes a blender to blend the end user views to generate a view for display.

A method for generating multiple video streams at a server is provided. The method includes receiving an input video stream. The method also includes generating a view independent stream from the input video stream. The method further includes generating a first view dependent stream using the input video stream and the view independent stream for a first viewpoint, wherein the independent view stream and the first view dependent stream has at least one different geometry. Further, the method includes generating a metadata file comprising the first viewpoint and corresponding view of the first view dependent stream. The method also includes storing the view independent stream, the first view dependent stream, and the metadata file.

A system for generating multiple video streams is provided. The system includes a receiver to receive an input video stream. The system also includes an independent view generator to generate a view independent stream from the input video stream. The system further includes a dependent view generator to generate a first view dependent stream using the input video stream and the view independent stream for a first viewpoint, wherein the independent view stream and the first view dependent stream has at least one different geometry, and to generate a metadata file comprising the first viewpoint and corresponding view of the first view dependent stream. Further, the system includes a storage device to store the view independent stream, the first view dependent stream, and the metadata file.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 7 illustrates a table indicating performance, in accordance with an example embodiment of the present disclosure;

FIG. 12 illustrates a metadata file, in accordance with an example embodiment of the present disclosure;

Figure 1:
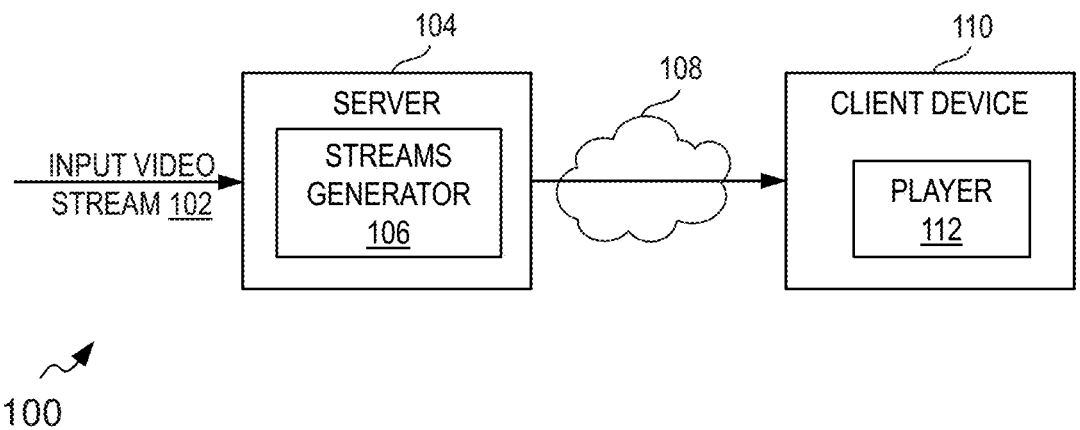
FIG. 1 illustrates an environment, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

A method and a system for constructing view from multiple streams having different properties such as frame rate, geometries etc., by a virtual reality (VR) device are provided.

The input video stream is received by a server and encoded. Before encoding, the input video stream is processed to identify an independent view (or an independent view stream) and one or more dependent views (or dependent view streams). In one embodiment, the independent view corresponds to a background and one or more dependent views correspond to foreground when viewed from one or more view points. The independent view and the one or more dependent views are then encoded to generate an encoded independent view and at least one encoded dependent view. The encoded views are then stored.

The independent view has higher field of view compared to the dependent view. The dependent view has higher quality within defined field of view. In one embodiment, the independent view or the independent view stream uses cube or equirectangular mesh geometry. The dependent view or the dependent view stream uses trapezoidal or pyramidal mesh geometry. The independent view stream has higher latency as compared to the dependent view stream.

A user's device, for example a VR device or any other device such as mobile phone that has VR application and capabilities, accesses a 360-degree video. A view corresponding to user view is identified. The view (also referred to as adaptive view) is identified based on user's head position and orientation. Based on the adaptive view, the stored dependent view is accessed along with the corresponding independent view. The stored dependent view (also referred to as dependent view stream) and the stored independent view (also referred to as independent view stream) are then decoded and blended to construct (also referred to as 'reconstruct') the view for display on the user's device. In various embodiments, the stored dependent view stream and the independent view stream are synchronized.

In various embodiments, multiple streams, i.e. independent view stream and dependent view stream, that are received may have different frame rates, geometries, view points, resolutions etc. The streams are created in such a way to optimize on bandwidth, storage and processing requirements. For example, the dependent view stream saves on storage as it only has field of view with high quality.

Description of Terms (In Addition to Plain and Dictionary Meaning)

The stream includes one or more independent views that are used to reconstruct a 360-degree view. The stream also includes dependent views in addition to one or more independent views for constructing the 360-degree view. The stream in turn includes one or more streams that have different properties such as buffering requirement, frame rate, bit rate, latency, geometry, resolution, view point, i.e. view independent or view adaptive, etc. The streams having at least one different property are considered different. In addition, the stream includes an associated mesh that defines how the stream transforms from three-dimensional (3D) space to two-dimensional (2D) space.

The independent view (independent view stream) has higher field of view compared to the dependent view. The dependent view (dependent view stream) has higher quality within defined field of view. In one embodiment, the independent view or the independent view stream uses cube or equirectangular mesh geometry, is a background low-temporal stream, has low frequency, i.e. less than 4 hertz (hz), has high resolution, and has forward surface that encodes to equivalent of the dependent view stream. The dependent view or the dependent view stream uses trapezoidal or pyramidal mesh geometry, is a foreground high-temporal stream, has high frequency, i.e. 30 Hz or so, has high resolution in front, degrading resolution at side, degrading to linear resolution for back, has forward surface that encodes to equivalent in the independent view stream, and has same mesh as the independent stream so that the encoded independent stream can be decoded for processing. The independent view stream has higher latency as compared to the dependent view stream.

An adaptive view point has a direction of view that is determined by user, for example determined based on user's head orientation and position. The adaptive view stream, i.e. dependent view stream, has lower field of view compared to independent view stream. The quality is highest within defined field of view for the adaptive view point stream while the quality of the areas outside defined field of view is low.

The processing of the video is done based on segments. A segment provides a boundary for change in view adaptation, i.e. view point. A segment includes sufficient information to decode a group of pictures (GOP) without referring to any other segment. Each GOP starts from a major anchor frame (or key frame) of the input video and includes frames till next major anchor frame. The major anchor frame is a head picture and is usually encoded as an I-frame (intra frame) or I-picture. Within each GOP, there are multiple mini GOPs. Each mini GOP includes one sub-major anchor frame and multiple regular frames in between two sub-major anchor frames. The sub-major anchor frames are usually coded as P-frames or P-pictures while the regular frames are usually coded as B-frames or B-pictures or Bref frames or Bref pictures. The distance between the two sub-major anchor frames is called mini-GOP size. The distance between the two major anchor frames is called GOP size. In one embodiment, each segment may correspond to one background, i.e. one independent view, and one dependent view, i.e. foreground view with a defined field of view. In one embodiment, the segment has same number of frames as the GOP.

FIG. 1 illustrates an environment 100, in accordance with an example embodiment of the present disclosure.

The environment 100 includes a server 104 that receives an input video stream 102, hereinafter referred to as the stream 102. The stream 102 includes multiple segments. Each segment includes a group of pictures (GOP). The stream 102 is processed by a streams generator 106 to identify an independent view, i.e. background and an adaptive view, i.e. foreground. The identification is performed using any existing technique. Post identification, the streams generator 106 then generates independent view stream and dependent view stream. The generated streams have different geometries. The streams generator 106 is customizable or programmable to enable generation of different geometries stream as per requirement, i.e. bit rates, resolution and shape.

Both the independent view stream and the dependent view stream are then encoded using existing techniques to generate encoded independent view stream and encoded dependent view stream. Several dependent view streams are generated for multiple view points. The encoded streams are then stored by the server 104.

In various embodiments, a metadata file including a list of view streams and associated orientation of the view streams is also generated and stored. The independent view stream has no orientation associated with it. Each dependent view stream has orientation metadata associated with it. The metadata includes yaw, pitch and roll. The metadata define the orientation of that view when it was created. The metadata is stored in file associated with encoded streams.

FIG. 12 shows a table 1200 indicating content of a metadata file. Table 1200 includes multiple columns, for example a layer column 1214, a view column 1216, and a metadata column 1218. Table 1200 also includes one or more rows 1204 to 1212. Each row corresponds to a view and includes corresponding metadata for that view in the metadata column 1218 and the view itself in the view column 1216.

The encoded streams are then streamed over a network 108 to a client device (also referred to as 'user device') 110. The client device 110 includes a player 112 for receiving the encoded streams and constructing view for display on the client device 110. The client device 110 can be a virtual reality device or a combination of virtual reality device and smartphone, or any other possible combination or device that supports such functionality.

The player 112 identifies view point based on orientation and position of the client device 110. The dependent stream corresponding to the view point is identified using the metadata file including the table 1200 and decoded. Similarly, the independent view stream is identified using the metadata file including the table 1200 and decoded using any existing technique. The player 112 scans through the metadata file associated with all available views and matches the closest view to the orientation of the client device 110. The player 112 then fetches the appropriate view. At some point later, when the view is selected for display, the player 112 selects the final view for output based on the available views. This is done because some pre-buffering can hide network latencies and jitter and so the view is actually sampled at 2 points (1) when the view is fetched, and (2) when the view is selected for display. Table 1200 helps to define correct orientation of the view in 3D space.

The independent view stream (also referred to as the background stream) representing the background and the dependent view stream (also referred to as the foreground stream) representing the foreground corresponding to the adaptive view point are blended to generate view for display to the user. The blending here refers to combination of two images to generate a blended image. In one embodiment, blending occurs in 3D space, and is performed by a GPU (graphical processing unit) of the client device 110. The GPU performs a transformation from 3D world space to 2D screen space, with respect to the orientation of the source mesh (view independent or view dependent). The independent view stream (the independent view layer) has a separate orientation in 3D space to the dependent view stream (the dependent view layer), but they are due to align when transformed to 2D space due to the GPU using a different rotation matrix for both layers. The pixel data fetched for the independent view layer, and the pixel data fetched for the dependent view layer are blended using the following formula $$\text{OUT\_PIXEL} = \text{VIEW\_INDEPENDENT\_PIXEL} + ((\text{VIEW\_DEPENDENT\_PIXEL} - 0.5) * 2.0)$$

This makes the independent view layer a 'difference' value between the dependent view layer, and the independent view layer. At key-frame boundaries, the dependent view layer contains a clean version of full image. The independent view layer is always blank (since there is no difference), the actual value of the pixels in the independent view layer is 0.5 (it appears as a grey image). Since the independent view layer is differential to the dependent view layer, it can additively or subtractively reconstruct the original target pixel.

At GOP boundaries, this makes no difference to the image, but subsequent frames are successively more different as the dependent view image/stream updates are at 1 frame per GOP, and the independent view image/stream is at every frame in the GOP.

In one embodiment, the background stream is updated at one frame per second, is 3072×2048 pixels in size, and is a cube mapped image. The foreground stream is 30 frames per second, 1440×1440 pixels in size, and uses a trapezoid shape. In various embodiments, various shapes could be used for the foreground or background image or streams. Similarly, there are no restrictions, other than the capabilities of the client device 110, on how many streams can be combined. In illustrated embodiment, the background stream is view independent i.e. doesn't matter which direction the user is looking, and the foreground stream is view dependent, i.e. best image quality is in the direction the user is currently looking.

Without limiting to the scope of various embodiments, there is latency between switching the foreground view direction which is typically 0.5 to 1 seconds, and in this period of time the user's head can still turn a considerable amount. So to prevent seeing blank areas, a degraded image for that portion is streamed. However, when the view update is complete, the higher quality front view is constructed and displayed.

Figure 2:
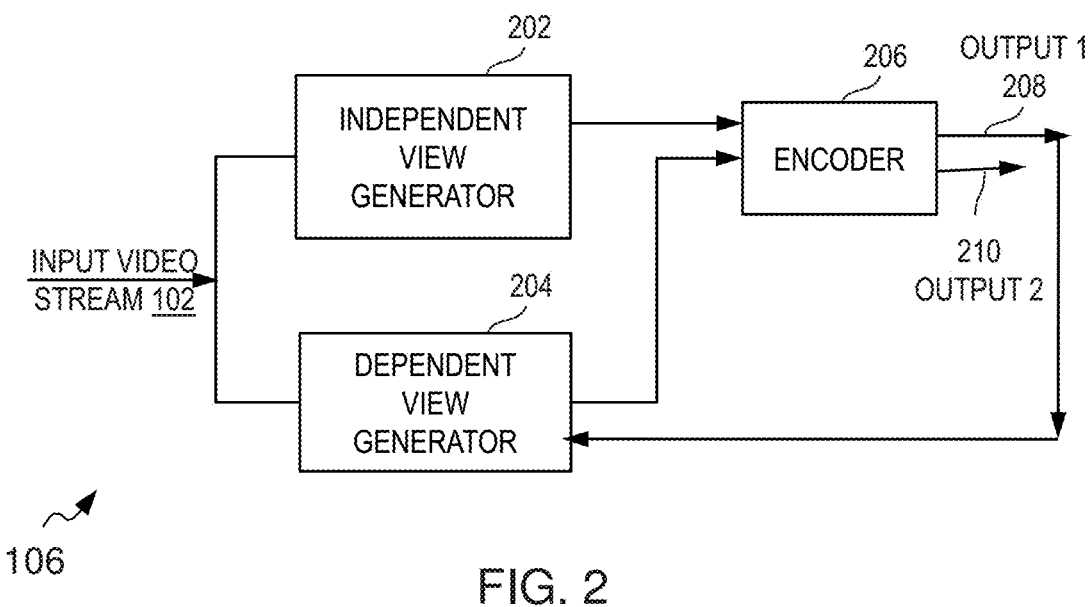
FIG. 2 illustrates an encoder, in accordance with an example embodiment of the present disclosure.

FIG. 2 illustrates the streams generator 106, in accordance with an example embodiment of the present disclosure.

The streams generator 106 receives input video stream 102 via a receiver (not shown) and processes the stream 102.

An independent view generator 202 identifies the background and generates an independent view stream representing the background. Similarly, a dependent view generator 204 identifies the foreground and generates dependent view stream representing the foreground. The foreground stream and the background stream can have one or more different properties. Multiple dependent view streams are generated by processing the stream 102 corresponding to multiple view points by the dependent view generator 204. The independent view stream and the dependent view stream are encoded by an encoder 206 to generate encoded independent view stream and encoded dependent view stream. Multiple dependent view streams are generated and stored. In illustrated embodiment, the independent view stream is shown by an output 1 208 and the dependent view stream is shown by an output 2 210.

For the independent view layer or stream following steps are followed:

1) Convert equirectangular 360-degree image or video stream or layer to cube map at 1 frame per GOP, and 2) Encode view-independent image The independent view generator 204 converts equirectangular input video stream into cubemap stream, and encodes the cubemap stream to generate the view independent stream.

For the dependent view layer or stream following steps are followed

1) Convert equirectangular 360-degree image or video stream or layer to cube map (for independent view layer reference) at 1 frame per GOP, 2) Rotate equirectangular sphere to match required view position, 3) Perform trapezoid (or whatever mesh), conversion from 3D space to 2D space, and 4) Encode view-dependent image.

In some embodiments, what is fed into the view dependent generator 206 is not the output 1 208 as it is but the decoded version of the output 1 208 as a reference of the view independent stream.

The output 2 210 includes several view dependent streams for several viewpoints, for example first view dependent stream for first viewpoint and second view dependent stream for second viewpoint. The metadata file also includes views corresponding to the first view dependent stream and the second view dependent stream, and the first viewpoint and the second viewpoint.

The dependent view generator 206 performs view adaptive rotation on the input video stream, converts rotated input video stream into a first trapezoid stream, performs view adaptive rotation on the view independent stream, i.e. the output 1 208, converts rotated view independent stream into a second trapezoid stream, processes the first trapezoid stream and the second trapezoid stream using a function, and encodes the processed stream to generate the view dependent stream, i.e. the output 2 210. The dependent view generator 206 performs similar steps for multiple viewpoints and hence, the output 2 210 has multiple streams and the metadata file includes details for multiple streams. In some embodiments, the encoder 206 is part of the independent view generator 204, and of the dependent view generator 206.

The encoded streams are then stored for streaming. The encoding is further explained in detail below in FIG. 8.

Figure 3:
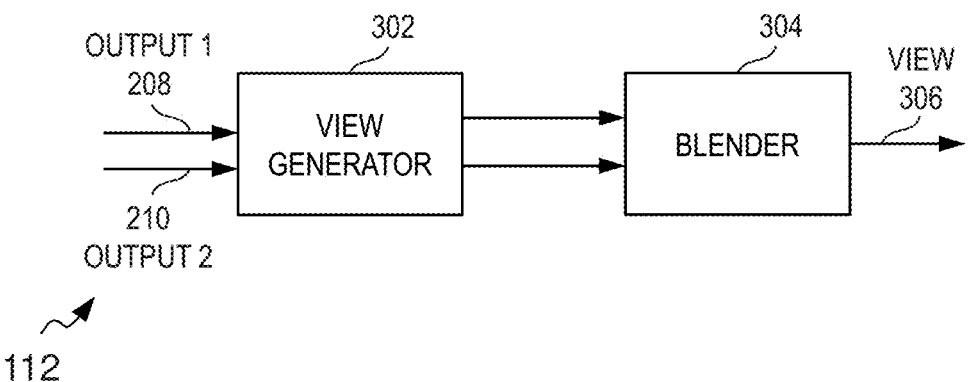
FIG. 3 illustrates a player, in accordance with an example embodiment of the present disclosure.

FIG. 3 illustrates the player 112, in accordance with an example embodiment of the present disclosure.

The player 112 is used for performing playback of 360-degree video. The player 112 receives the output 1 208 through a receiver (not shown) and the output 2 210 as streams. In illustrated embodiment, the orientation and position of the client device 110 is detected and a view point corresponding to the detected position and orientation is determined. The view point corresponds to the output 2 210 view point. The output 1 208 and the output 2 210 have different properties. The output 1 208 and the output 2 210 are then fed into a view generator 302 for decoding and generation of end user views. Before feeding into the view generator 302, the output 2 210 is processed through a selector (not shown) to select a stream from the output 2 210 based on view point of the user. The view generator 302 may have multiple components, such as an independent view generator and a dependent view generator. The independent view generator generates end user view from view independent streams. The dependent view generator generates end user view from vide dependent streams. In some embodiments, the output 1 208 and the output 2 210 are also synchronized using a synchronizer (not shown). The decoded background stream (end user view from view independent stream) and the decoded foreground stream (end user view from view dependent stream) are then blended using a blender 304, for example a custom shader, to construct a view 306 for display on the client device 110. The decoding is explained in conjunction with FIG. 9 to FIG. 11.

The client device 110 is able to decode multiple streams. In one embodiment, the specification of the streams include foreground stream with 1448*1448 resolution at 30 fps (frames per second) and background stream with 3072*2048 resolution at 1 fps.

The client device 110, i.e. the player 112 also synchronizes the streams with respect to time. The client device 110 also includes a GPU that is capable of performing shader operations. In one embodiment, the GPU performs at least four full screen passes at high video frame rate.

It is to be appreciated that the encoders and decoders shown in FIG. 2 and FIG. 3 can be one single encoder and one single decoder or can be multiple instances of encoder and decoder.

Figure 4:
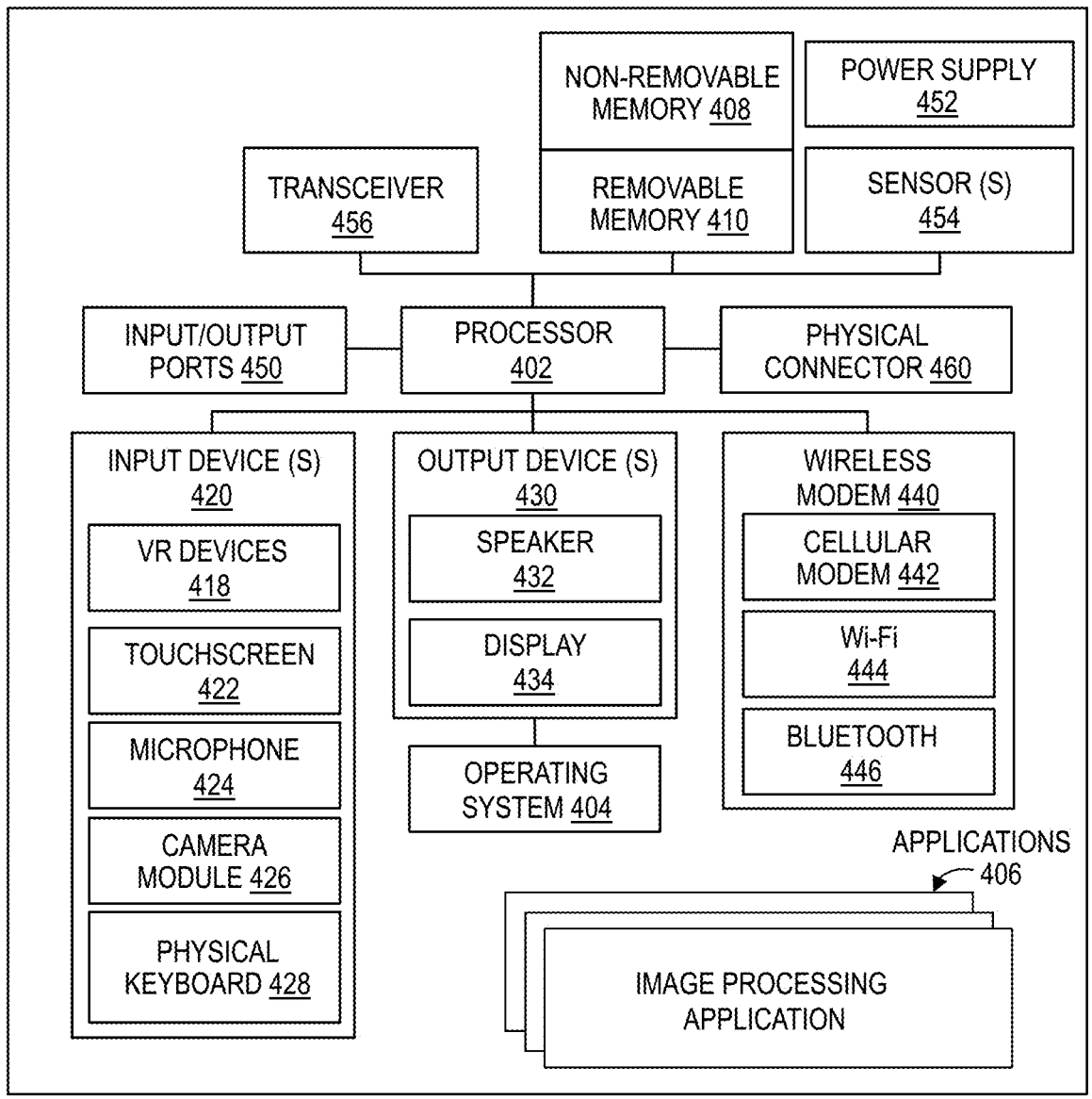
FIG. 4 illustrates a client device, in accordance with an example embodiment of the present disclosure.

FIG. 4 illustrates a block diagram 400 that represents the client device 110, in accordance with an example embodiment of the present disclosure.

It should be understood that the client device 110 as illustrated and hereinafter described is merely illustrative of one type of device and should not be taken to limit the scope of the embodiments. As such, it should be appreciated that at least some of the components described below in connection with the client device 110 may be optional and thus in an example embodiment may include more, less or different components than those described in connection with the example embodiment of the FIG. 4. As such, among other examples, the client device 110 could be any of a mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated client device 110 includes a controller or a processor 402 (e.g., a signal processor, microprocessor, ASIC, or other control and processing logic circuitry) for performing such tasks as signal coding, data processing, image processing, input/output processing, power control, and/or other functions. Although one processor 402 is shown for sake of convenience, it is to be understood that more than one processor can be present in some embodiments. For example, in one embodiment the client device 110 can have one CPU (central processing unit) and one GPU. An operating system 404 controls the allocation and usage of the components of the client device 110 and support for one or more applications programs (see applications 406), such as a VR application, that implements one or more of the innovative features described herein.

The illustrated client device 110 includes one or more memory components, for example, a non-removable memory 408 and/or removable memory 410. The non-removable memory 408 can include RAM, ROM, flash memory, a hard disk, or other well-known memory storage technologies. The removable memory 410 can include flash memory, smart cards, or a Subscriber Identity Module (SIM). The one or more memory components can be used for storing data and/or code for running the operating system 404 and the applications 406. Example of data can include web pages, text, images, sound files, image data, video data, or other data sets to be sent to and/or received from one or more network servers or other devices via one or more wired or wireless networks.

The client device 110 can support one or more input devices 420 and one or more output devices 430. Examples of the input devices 420 may include, but are not limited to, one or more VR devices 418 for providing head movement information and other related stimulus, a touchscreen 422 (e.g., capable of capturing finger tap inputs, finger gesture inputs, multi-finger tap inputs, multi-finger gesture inputs, or keystroke inputs from a virtual keyboard or keypad), a microphone 424 (e.g., capable of capturing voice input), a camera module 426 (e.g., capable of capturing still picture images and/or video images) and a physical keyboard 428. Examples of the output devices 430 may include, but are not limited to a speaker 432 and a display 434. Other possible output devices (not shown in the FIG. 4) can include piezoelectric or other haptic output devices. Some devices can serve more than one input/output function. For example, the touchscreen 422 and the display 434 can be combined into a single input/output device.

A wireless modem 440 can be coupled to one or more antennas (not shown in the FIG. 4) and can support two-way communications between the processor 402 and external devices, as is well understood in the art. The wireless modem 440 is shown generically and can include, for example, a cellular modem 442 for communicating at long range with the mobile communication network, a Wi-Fi compatible modem 444 for communicating at short range with an external Bluetooth-equipped device or a local wireless data network or router, and/or a Bluetooth-compatible modem 446. The wireless modem 440 is typically configured for communication with one or more cellular networks, such as a GSM network for data and voice communications within a single cellular network, between cellular networks, or between the client device 110 and a public switched telephone network (PSTN).

The client device 110 can further include one or more input/output ports 450, a power supply 452, one or more sensors 454 for example, an accelerometer, a gyroscope, a compass, or an infrared proximity sensor for detecting the orientation or motion of the client device 110, a transceiver 456 (for wirelessly transmitting analog or digital signals) and/or a physical connector 460, which can be a USB port, IEEE 1394 (FireWire) port, and/or RS-232 port. The illustrated components are not required or all-inclusive, as any of the components shown can be deleted and other components can be added.

Figure 5:
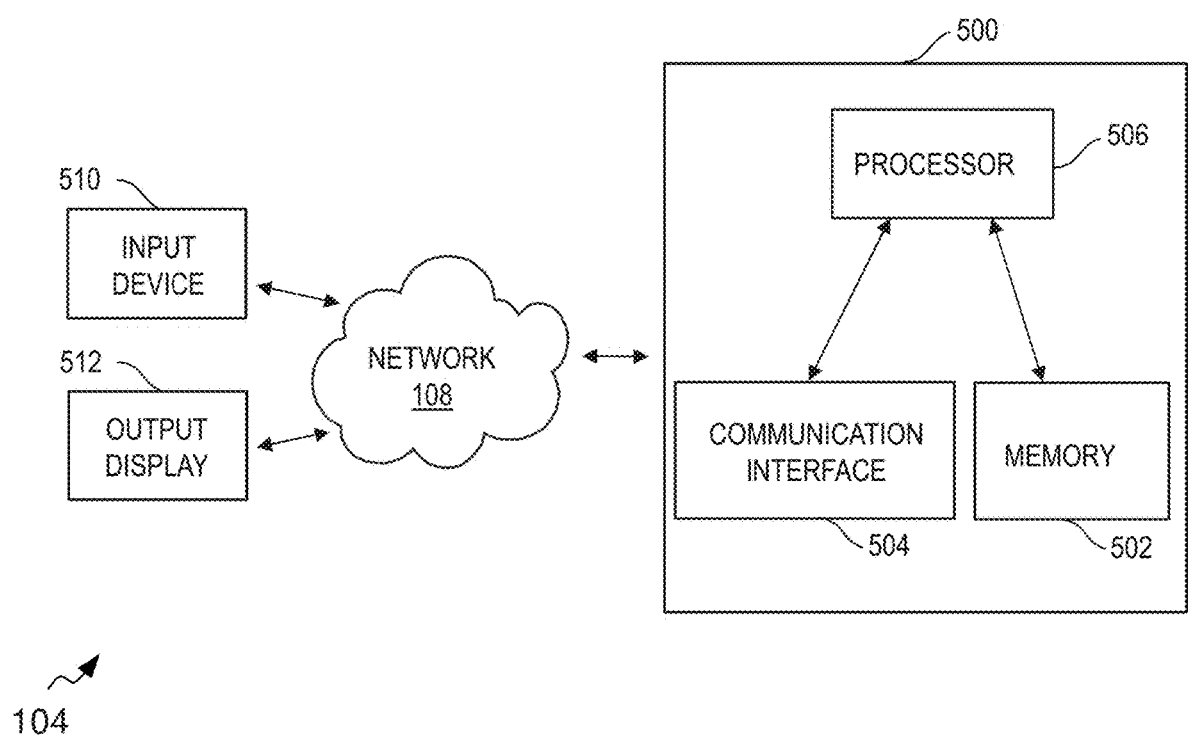
FIG. 5 illustrates a server, in accordance with an example embodiment of the present disclosure.

FIG. 5 illustrates a block diagram 500 that represents the server 104, in accordance with an example embodiment of the present disclosure. In an embodiment, the server 104 includes a memory 502, a communication interface 504 and at least one processor 506 for performing image processing including receiving, encoding/decoding, image-video-audio processing, and streaming of input video.

The memory 502 is a storage device embodied as one or more volatile memory devices, one or more non-volatile memory devices, and/or a combination of one or more volatile memory devices and non-volatile memory devices, for storing micro-contents information and instructions. The memory 502 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The communication interface 504 may enable the server 104 to communicate with one or more client devices (e.g., client device 110 as shown in FIG. 1) through the network 108.

In an embodiment, the server 104 is also shown to take an input from an input device 510, which is directly coupled to the server 104 or via the network 108 for receiving input video streams (e.g., input video stream 102 as shown in FIG. 1). The server 104 further shows an output display 512, such as but not limited to a cathode ray tube (CRT), a LCD screen, a mobile device screen and a laptop screen for displaying information to the user. The communication interface 504 is capable of communicating with the network 108, example of which may include but are not limited to, wired, wireless cell phone networks, Wi-Fi networks, terrestrial microwave network, or any form of Internet. While only one input device 510 and one output display 512 is depicted in FIG. 5 for illustrative purposes, and it would be apparent that any number of input devices and output devices can be coupled with the server 104 through the network 108.

The processor 506 is communicably coupled with the memory 502 and the communication interface 504. The processor 506 is capable of executing the stored machine executable instructions in the memory 502 or within the processor 506 or any storage location accessible to the processor 506. The processor 506 may be embodied in a number of different ways. In an embodiment, the processor 506 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 506 performs various functionalities of the server 104 as described herein.

Figure 6:
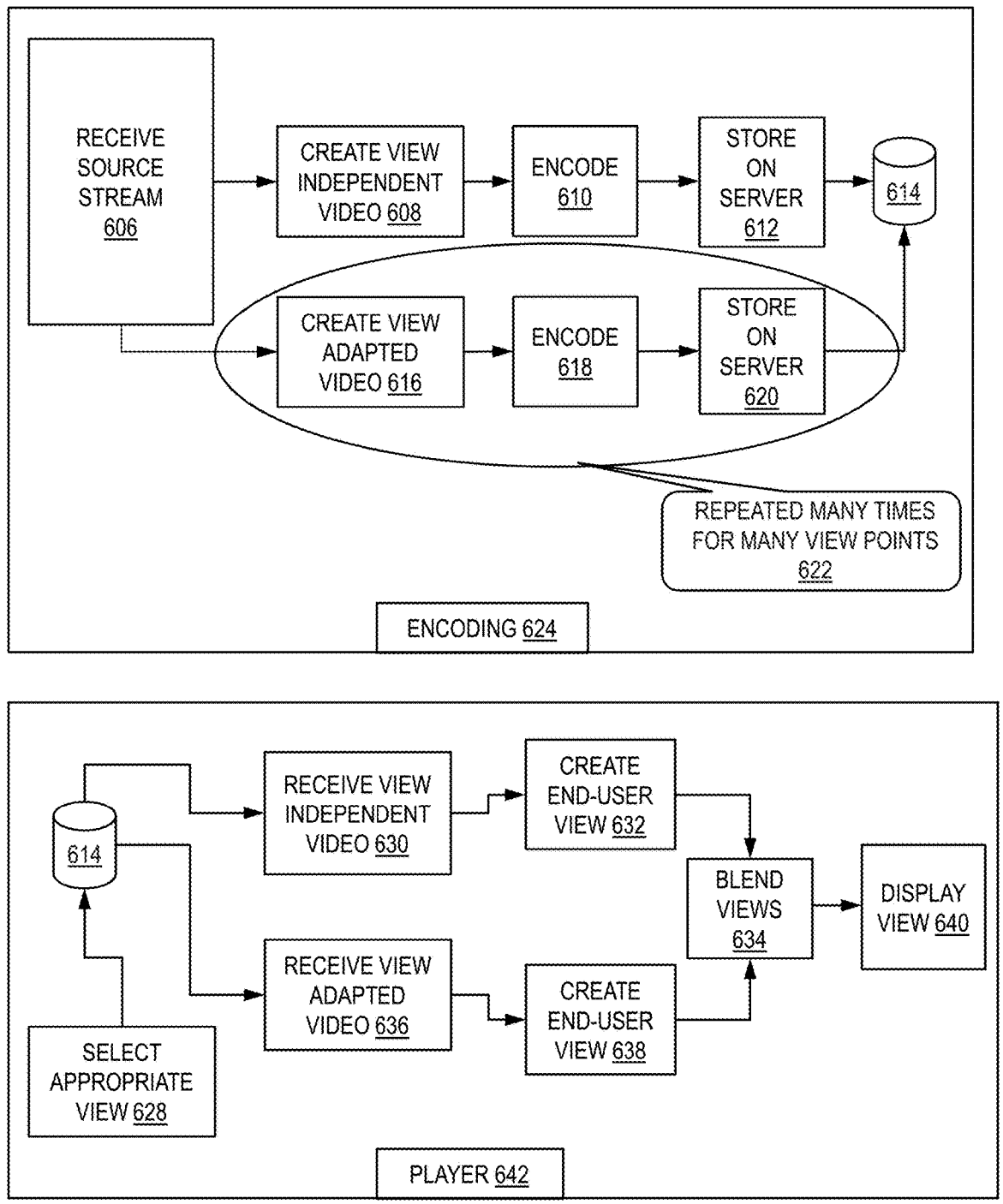
FIG. 6 illustrates a process flow for constructing view, in accordance with an example embodiment of the present disclosure.

FIG. 6 illustrates an example representation of a process flow 600 for constructing view, in accordance with an example embodiment of the present disclosure. The process flow 600 shows an encoding process 624 performed by the server 104 and a player process 642 performed by the player 112. In an example embodiment, the operation of the process flow 600 can be performed in various orders. As such, these operations can be performed in a sequential or simultaneous manner, and their specific order as shown in FIG. 6 or as described herein should not be understood as limiting to the scope of the present disclosure.

The encoding process 624 includes receiving an input video stream at step 606. The stream is then processed and at step 608 a view independent video stream, i.e. background stream, is created. At step 610, the independent view stream (also referred to as view independent stream) is encoded. At step 612, the independent view stream is stored by the server 104 in a storage device, for example a storage device 614. Similarly, at step 616, a view dependent video stream, i.e. foreground stream, is created and then encoded at step 618. The encoded view dependent stream (also referred to as dependent view stream) is then stored on the storage device 614. In one embodiment, the view independent stream and the view dependent stream have at least one different property. It is to be appreciated that the steps 608 and 616 are performed simultaneously.

The process for encoding dependent view stream is repeated for multiple view points and for each view point a corresponding dependent view stream is encoded and stored. The metadata file including orientation details for various views and corresponding views is also generated and stored in the storage device 614.

The stored video streams are then streamed to or sent to the client device 110 and processed by the player 112. At step 628, an appropriate view is selected based on orientation and position of the client device 110. The streams are fetched from the storage device 614. At step 630, a view independent video stream is fetched or received from the storage device 614 and at step 632 an end user view of the view independent video stream is created. The creation includes decoding the stream. Similarly, at step 636, a view dependent video stream is fetched or received from the storage device 614 and at step 638 an end user view of the view dependent video stream is created. The end user view creation includes accessing the metadata file, identifying the orientation of the user, identifying view corresponding to the orientation in the metadata file that matches the orientation of the user, and using identified view from the metadata file to generate the end user view. The creation also includes decoding the stream/view. It is to be appreciated that the steps 632 and 638 are performed simultaneously. At step 634, the views are blended to construct view for display and the view is displayed on the client device 110 at step 640.

FIG. 7 illustrates a table 700 indicating performance, in accordance with an example embodiment of the present disclosure. The table 700 indicates image encoding type according to various methods in a column 702. The column 702 includes methods such as traditional equirectangular method 714, background stream encoding method 716 of present disclosure, and foreground stream encoding method 718 of present disclosure. Columns 704, 706, 708 and 710 show respect width, height, frame rate, and total pixels per second for these methods. The value 724 which is way less than the value 722 indicates that the number of pixels decoded using traditional method (at 726) is way higher than number of pixels decoded in present disclosure (at 728).

By using mesh and dependent and independent view streams having different geometries, the method of the present disclosure allows control of data bandwidth allocation separate regions of a 3D view. The process allows defining region of interest in source video stream to provide high quality in portions of view. Also, the separate processing of independent and dependent view streams enable low latency for rapid view point switching. The dependent view is differential image of lower frame rate background and hence, allows efficient encoding and decoding.

Figure 8:
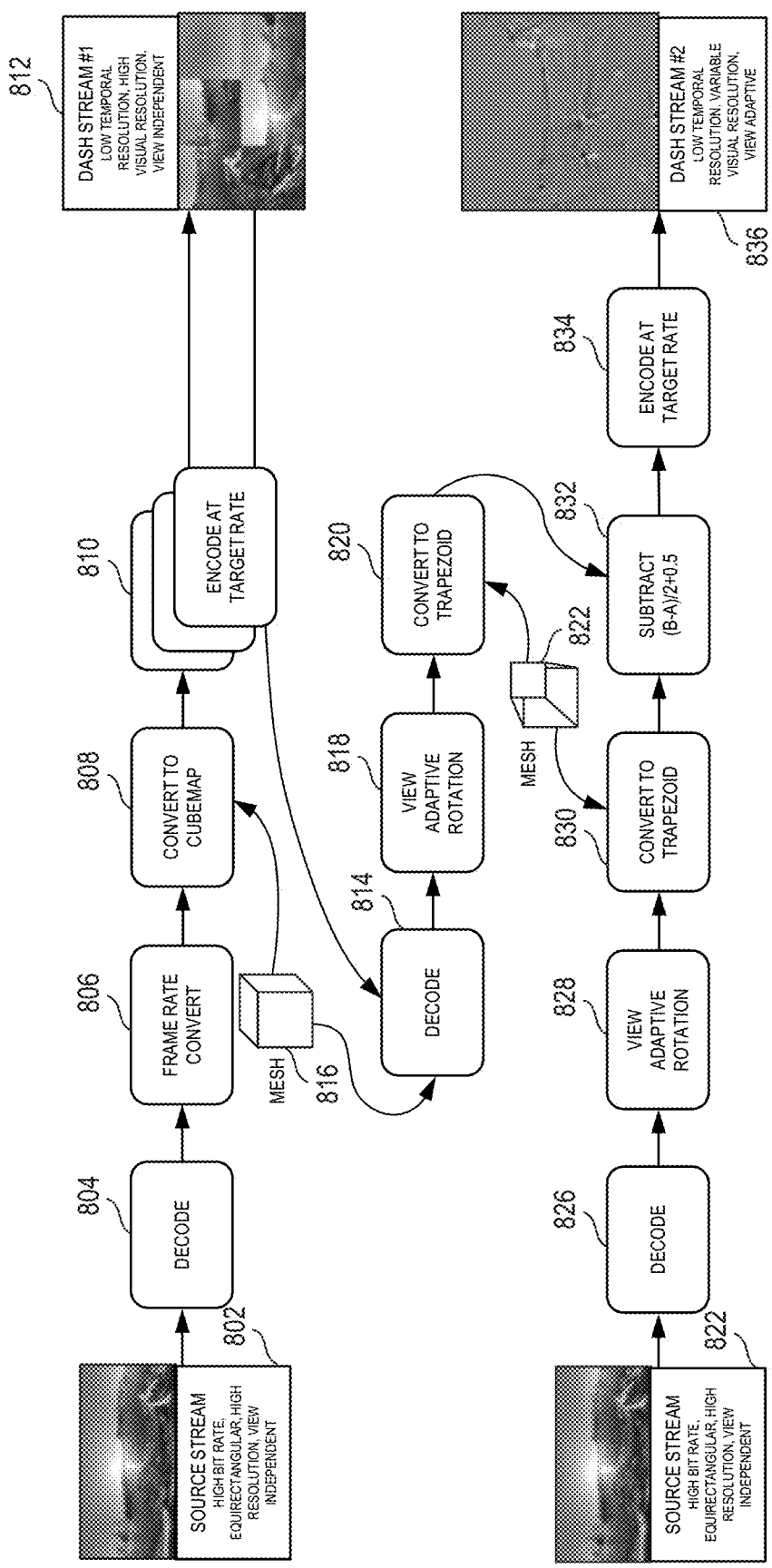
FIG. 8 illustrates a process flow for encoding, in accordance with an example embodiment of the present disclosure.

FIG. 8 illustrates a process flow 800 for encoding, in accordance with an example embodiment of the present disclosure.

In one embodiment, the streams generator 106 is capable of processing multiple streams, independent or dependent, simultaneously.

At step 802, the input video stream 102 is received. In one embodiment, the input video stream 102 is view independent, has high resolution and high bitrate, and is equirectangular. The input video stream 102 is decoded at step 804 followed by frame rate conversion at step 806. At step 808, the frame rate converted stream is converted to cubemap using a mesh 816. The cubemap is then encoded at desired target rate, at step 810, to generate an output 1 stream 208. The stream 208 is outputted at step 812 as a DASH stream #1 which has low temporal resolution, high visual resolution and is view independent. The stream 208 is also referred to as the view independent or the independent view stream.

In one embodiment, steps 802 to 812 are performed using the independent view generator 202 and the encoder 206.

Similarly, at step 822, which may be similar to step 802, the input video stream 102 is received by the dependent view generator 204. The input video stream 102 is decoded at step 826 followed by view adaptive rotation at step 828. At step 830, the input video stream 102, after rotated at step 828, is converted to trapezoid 1.

The DASH stream #1 (stream 208) is also processed and provided as an input to the dependent view generator 204. The stream 208 is decoded using the mesh 816 at step 814. The decoded stream is then rotated at step 818 using view adaptive rotation followed by conversion to trapezoid 2 at step 820 using a mesh 822. The mesh 822 helps in conversion of the stream from 3D space to 2D space.

Both trapezoidal streams are processed at step 832 using the formula (Trapezoid 2−Trapezoid1)/2+0.5 to generate view dependent stream which is encoded at desired target rate at step 834 to generate the OUTPUT 2 stream 210, also referred to as DASH stream #2 which has high temporal resolution, variable visual resolution, and is view adaptive or view dependent.

The processing by the view dependent generator 206 is performed for each view point or each view adaptive set, and hence the stream 210 is actually a collection of streams corresponding to each view point. The streams 208 and 210 are then sent to the client device 110.

The dependent view generator 204 performs the processing for each view point defined, in some embodiments, using yaw, pitch and roll. For each view point, i.e. at least one value being different in yaw, pitch, and roll, the metadata including the view point information and corresponding view is stored. The metadata file is associated with the stream 210 and provided to the client device 110.

Figure 9:
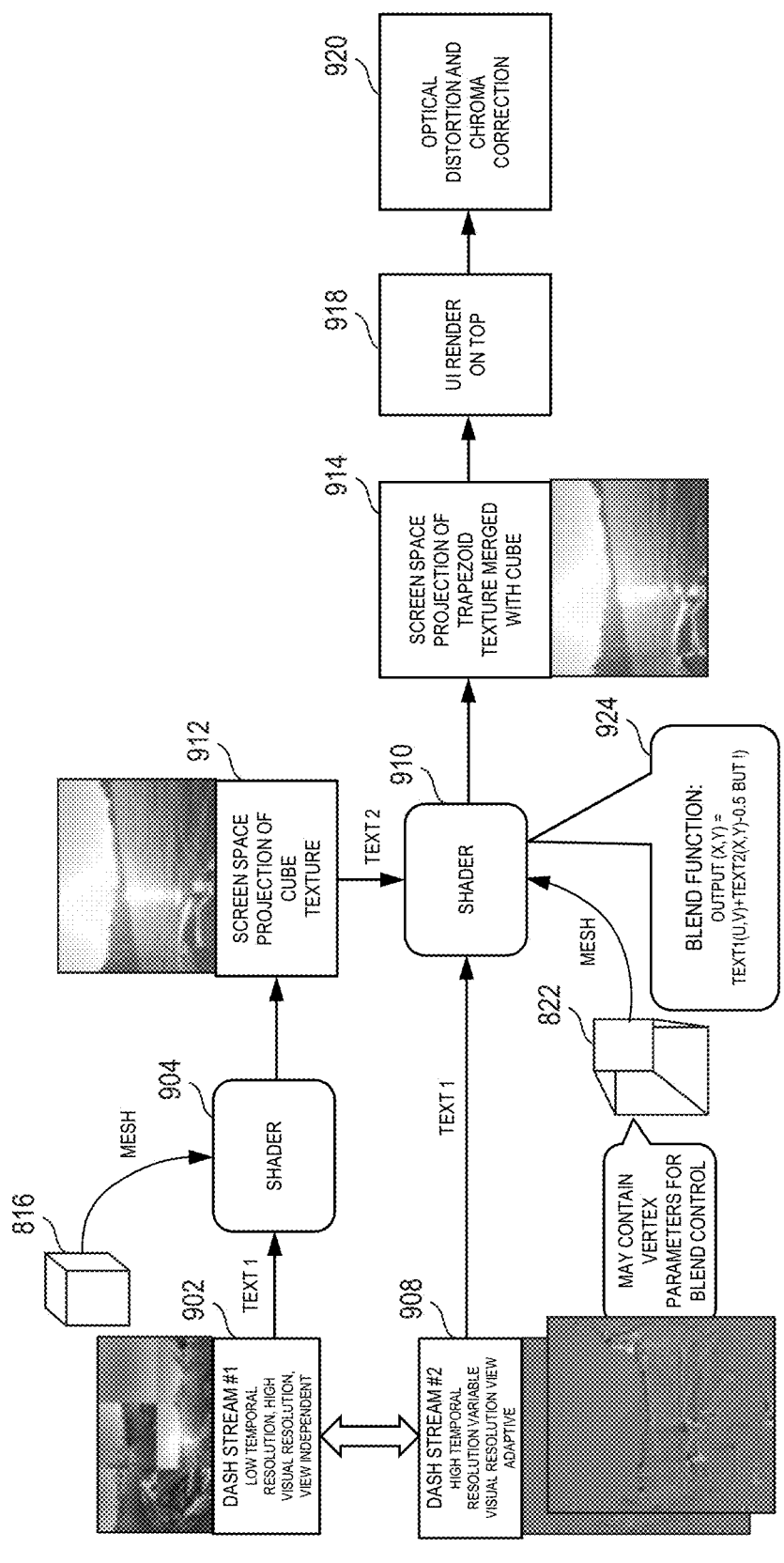
FIG. 9 illustrates a process flow for blending, in accordance with an example embodiment of the present disclosure.

FIG. 9 illustrates a process flow 900 for blending, in accordance with an example embodiment of the present disclosure.

The process flow 900 begins upon receipt of the stream 208 and 210 and is performed at the client device 110. In one embodiment, the DASH stream #1 and the DASH stream #2 are received at steps 902 and 908 respectively which can be processed in parallel. In some embodiments, the DASH stream #1 and the DASH stream #2 are synchronized before blending. Also, decoding for both may be performed.

At step 904, the DASH stream #1 is processed using shader to generate screen space projection of cube texture at step 912. The processing uses the mesh 816. The screen space is a common coordinate space. The output of the step 912 is stream TEX 2 which is the end user view for the DASH stream #1, i.e. the view independent stream.

The view orientation of the user is received as an input and the dependent view stream that needs to be processed is identified as TEX 1 stream (end view of the view adaptive stream) from the stream 210 using the metadata file.

At step 910, TEX 2 stream and TEX 1 stream are processed using the mesh 822 to convert the streams back to 3D space. The shader uses the mesh 822 that contains vertex parameters for blend control to blend the streams using, in one embodiment, the function OUTPUT (X, Y)=TEX 1(U, V)+TEX 2(X,Y)−0.5. In other embodiments, the function may differ.

At step 914, the blending results in generation of screen space projection of trapezoid texture merged with cube texture, i.e. view generation.

At step 918, the generated view is displayed using user interface renderer. The UI renderer renders the view on top.

At step 920, optical distortion and chroma correction is performed as per need.

Figure 10:
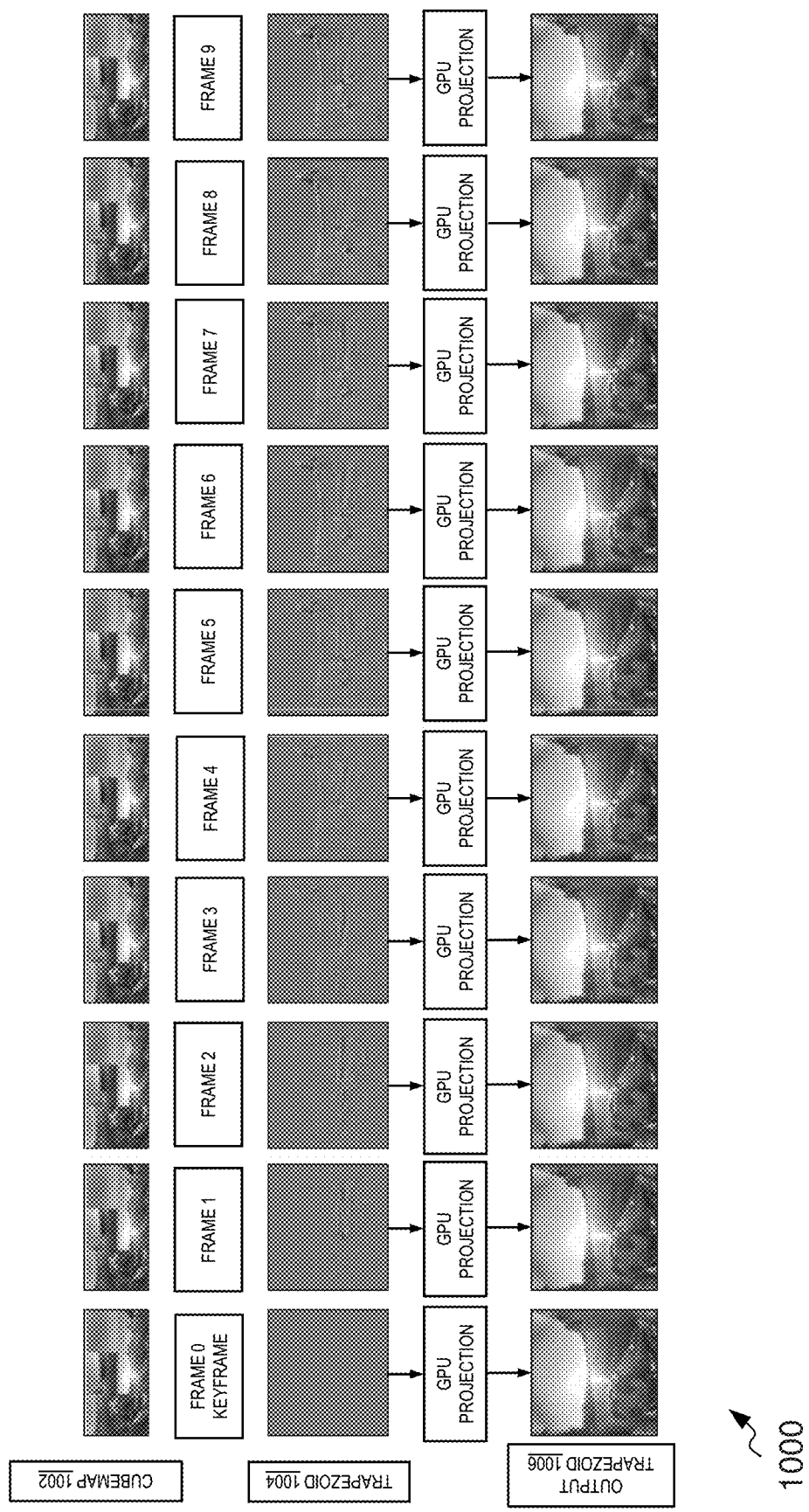
FIG. 10 illustrates an example for blending, in accordance with an example embodiment of the present disclosure.

FIG. 10 illustrates an example 1000 for blending, in accordance with an example embodiment of the present disclosure.

One or more cubemap textures 1002 for different frames are merged or blended with trapezoid textures 1004 for corresponding frame using GPU to generate output trapezoid textures 1006.

Figure 11:
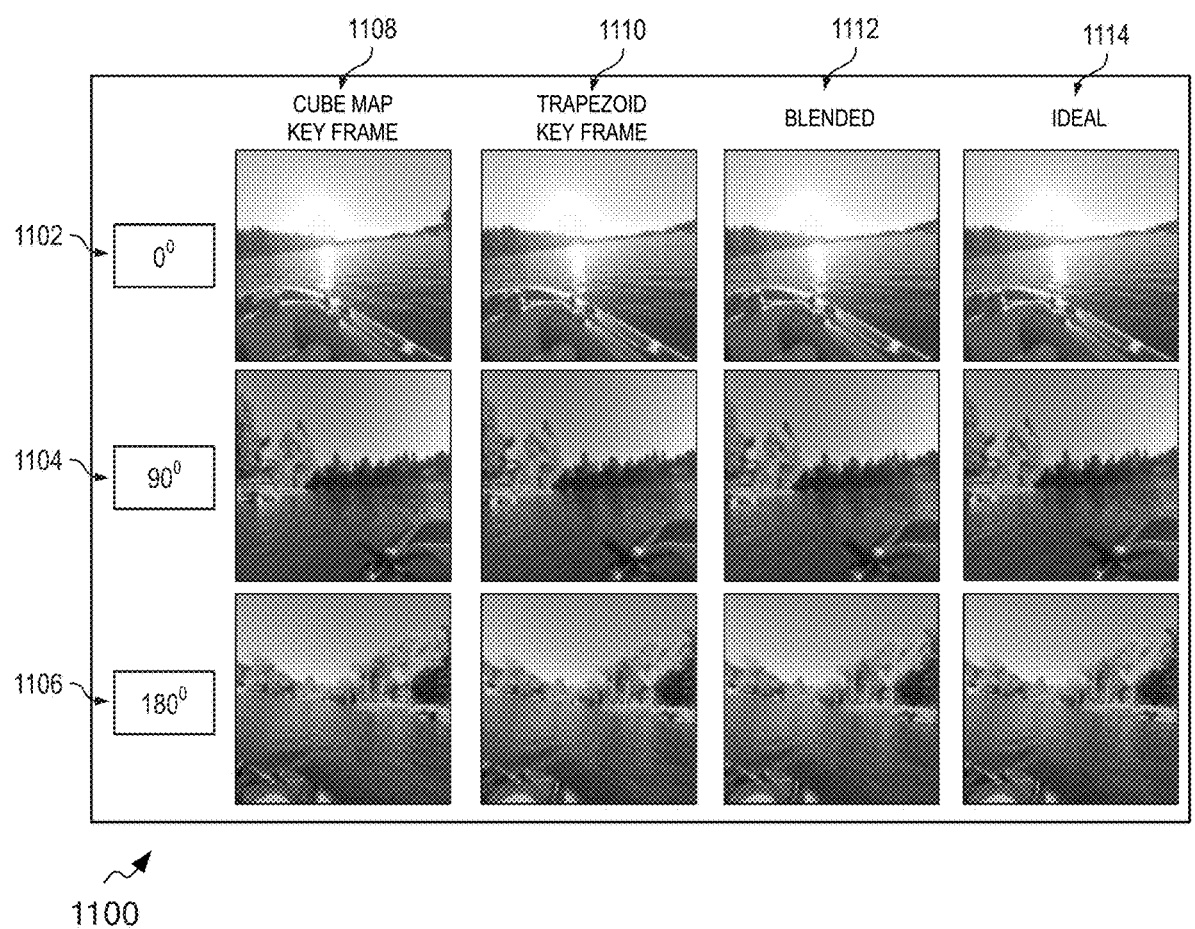
FIG. 11 illustrates results of blending, in accordance with an example embodiment of the present disclosure.

FIG. 11 illustrates results 1100 of blending, in accordance with an example embodiment of the present disclosure. Results 1100 show cubemap key frame 1108, trapezoid key frame 1110, blended key frame 1112, and ideal key frame 1114 for different angles, such as 0 degree 1102, 90-degree 1104, and 180-degree 1106.

Figure 13:
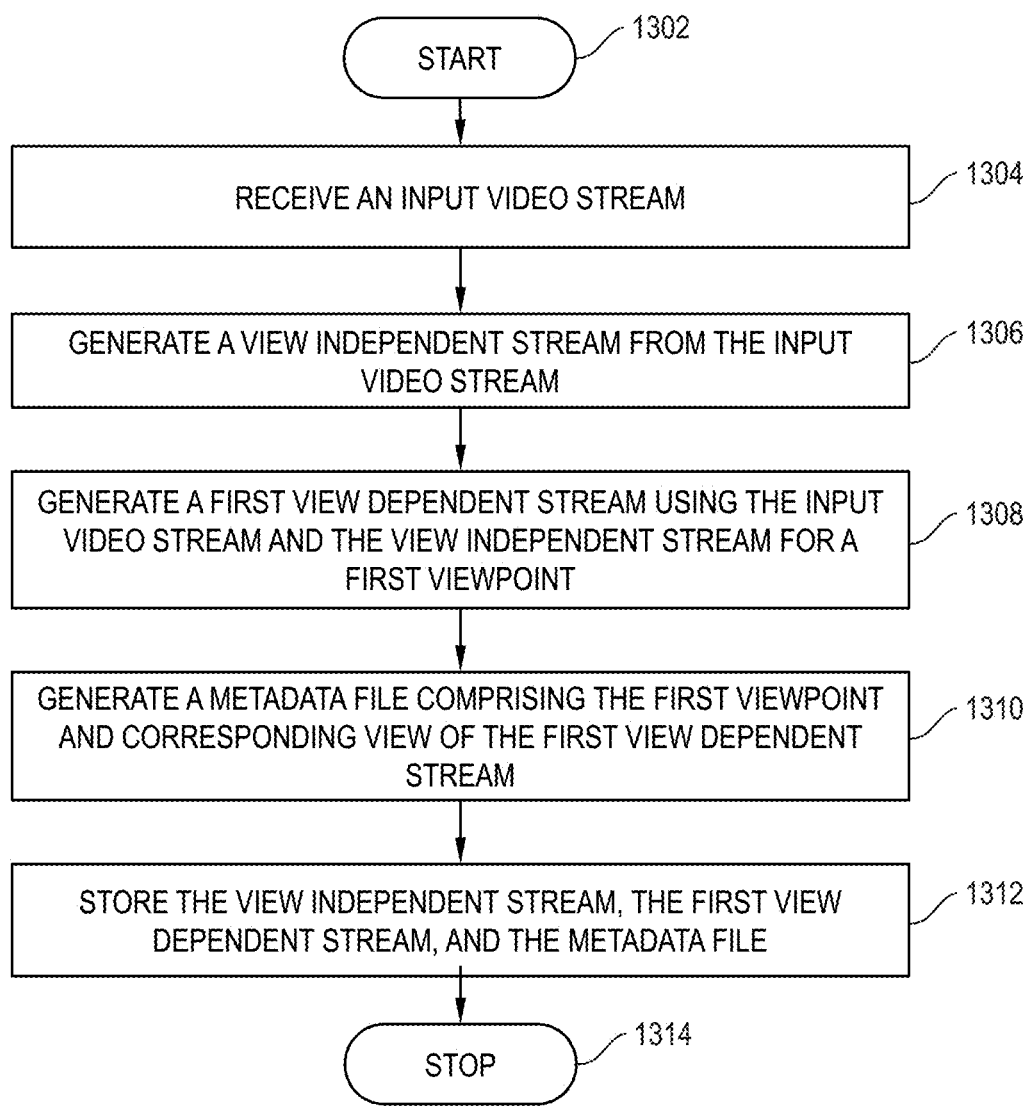
FIG. 13 illustrates a flowchart for generating multiple video streams at a server, in accordance with an example embodiment of the present disclosure.

FIG. 13 illustrates a flowchart for generating multiple video streams at a server, in accordance with an example embodiment of the present disclosure.

The method starts at step 1302.

At step 1304, an input video stream is received.

At step 1306, a view independent stream is generated from the input video stream. In one embodiment, the input video stream is shown as stream 802 and stream 822. The generating includes converting equirectangular input video stream into cubemap stream, and encoding the cubemap stream to generate the view independent stream. The generation is detailed in FIG. 8.

At step 1308, a first view dependent stream is generated using the input video stream and the view independent stream for a first viewpoint. The view independent stream is further processed as detailed in FIG. 8 before it is used for generating the first view dependent stream.

The independent view stream and the first view dependent stream has at least one different geometry.

In one embodiment, the generating includes performing view adaptive rotation on the input video stream, converting rotated input video stream into a first trapezoid stream, performing view adaptive rotation on the view independent stream, converting rotated view independent stream into a second trapezoid stream, processing the first trapezoid stream and the second trapezoid stream using a function, and encoding the processed stream to generate the view dependent stream.

At step 1310, a metadata file including the first viewpoint and corresponding view of the first view dependent stream is generated. Multiple view dependent streams are generated for multiple viewpoints and the processing remains the same.

The method also includes generating a second view dependent stream using the input video stream and the view independent stream for a second viewpoint, wherein the independent view stream and the second view dependent stream has at least one different geometry, and updating the metadata file with the second view point and corresponding view of the second view dependent stream.

At step 1312, the view independent stream, the metadata file, and the view dependent streams, including the first dependent view stream and the second dependent view stream are stored.

The method stops at step 1314.

Figure 14:
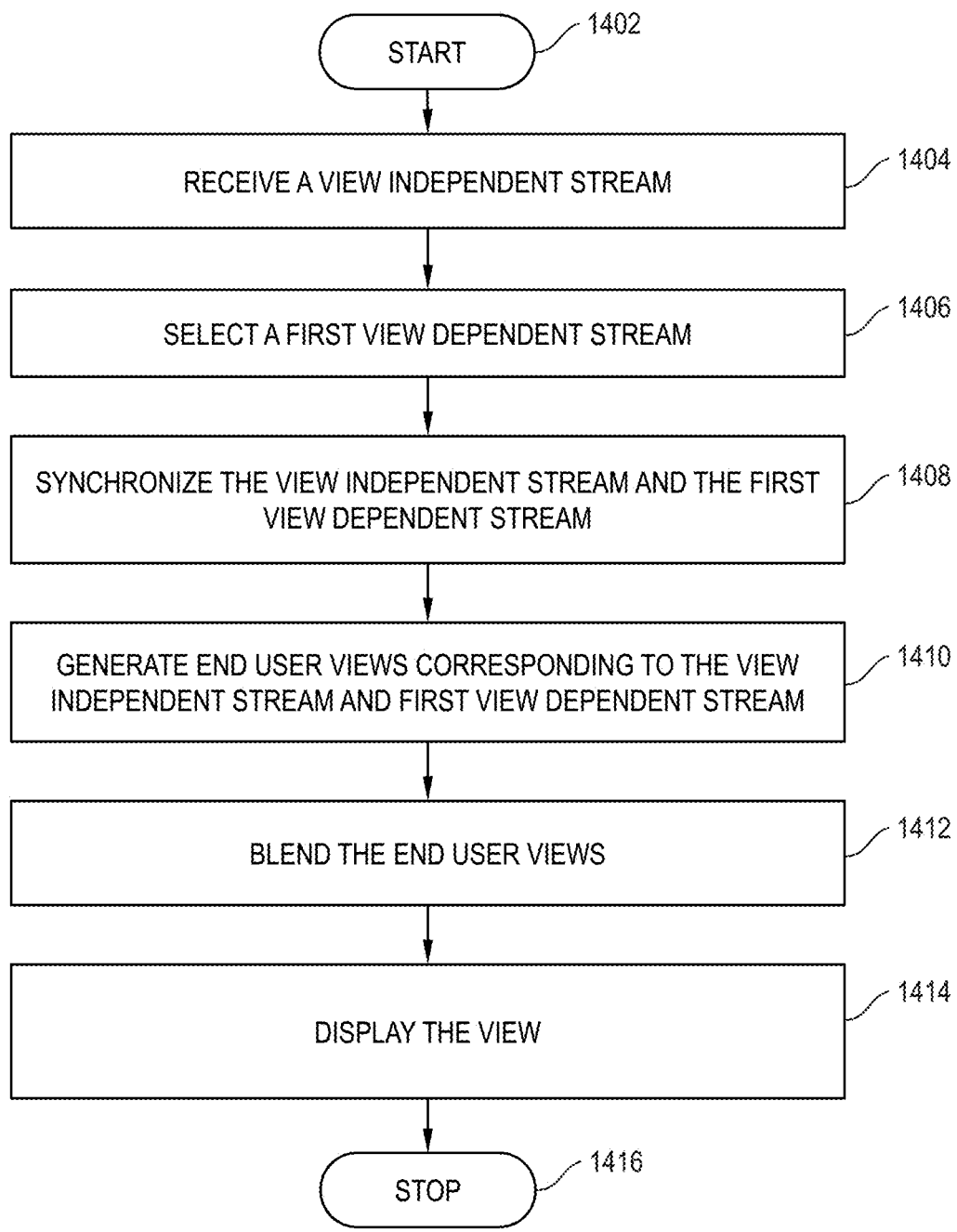
FIG. 14 illustrates a flowchart for constructing view from multiple video streams at a client device of a user, in accordance with an example embodiment of the present disclosure.

FIG. 14 illustrates a flowchart for constructing view from multiple video streams at a client device of a user, in accordance with an example embodiment of the present disclosure.

The method starts at step 1402.

At step 1404, a view independent stream is received.

At step 1406, a first view dependent stream is selected. The selection includes determining a view point of the user, and selecting the first view dependent stream using the view point. The selection also includes accessing a metadata file. The metadata file includes multiple view orientations and corresponding view for each view orientation. The selection further includes selecting the view corresponding to the view orientation which is closest to the view point of the user as detailed earlier.

The view independent stream and the first view dependent stream has at least one different geometry.

At step 1408, the view independent stream and the first view dependent stream is synchronized.

At step 1410, the end user views corresponding to the view independent stream and the first view dependent stream are generated as detailed earlier.

At step 1412, the end user views are blended to generate a view for display as explained in FIG. 9.

At step 1414, the view is displayed.

The method also includes selecting a second view dependent stream, wherein the view independent stream and the second view dependent stream has at least one different geometry. The method further includes generating end user views corresponding to the view independent stream and the second view dependent stream, and blending the end user views to generate a view for display.

With change in viewpoint of the user, the method of FIG. 14, i.e. steps 1406 to step 1414 are repeated. The step 1408 may need not be repeated if all streams are synchronized initially.

The method stops at step 1416.

In general, the method executed to implement the embodiments of the present disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects of the disclosure. Moreover, while the present disclosure has been described in the context of fully functioning computers and computer systems, those skilled in the art will appreciate that the various embodiments of the disclosure are capable of being distributed as a program product in a variety of forms, and that the present disclosure applies equally regardless of the particular type of machine or computer readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for constructing view from multiple video streams at a client device of a user, the method comprising:
   receiving a view independent stream, the view independent stream representing a background video stream;
   determining a view point of the user based on orientation and position of the client device;
   selecting a first view dependent stream, representing a foreground video stream, based on orientation metadata associated with the determined view point, wherein the view independent stream and the first view dependent stream have at least one different geometry, and wherein the view independent stream has a higher field of view than the first view dependent stream;
   generating end user views corresponding to the view independent stream and the first view dependent stream, wherein generating the end user views corresponding to the view independent stream and the first view dependent stream includes decoding the view independent stream and the first view dependent stream; and
   blending the end user views to generate a 360-degree oriented view for display.

2. The method as claimed in claim 1, wherein selecting the first view dependent stream comprises:
   accessing a metadata file, the metadata file comprising information of multiple view orientations and corresponding view for each view orientation; and
   selecting the view corresponding to the view orientation, which is closest to the determined view point of the user.

3. The method as claimed in claim 1 and further comprising:
   synchronizing the view independent stream and the first view dependent stream.

4. The method as claimed in claim 1 and further comprising:
   displaying the 360-degree oriented view.

5. The method as claimed in claim 1 and further comprising:
   selecting a second view dependent stream, wherein the view independent stream and the second view dependent stream have at least one different geometry;
   generating end user views corresponding to the view independent stream and the second view dependent stream; and
   blending the end user views to generate a view for display.

6. A system for constructing view from multiple video streams at a client device of a user, the system comprising:
   a receiver to receive a view independent stream, the view independent stream representing a background video stream;
   a selector to determine a view point of the user based on orientation and position of the client device, and select a first view dependent stream, representing a foreground video stream, based on orientation metadata associated with the determined view point, wherein the view independent stream and the first view dependent stream have at least one different geometry, and wherein the view independent stream has a higher field of view than the first view dependent stream;
   a view generator to generate end user views corresponding to the view independent stream and the first view dependent stream, wherein to generate the end user views, the view generator decodes the view independent stream and the first view dependent stream; and
   a blender to blend the end user views to generate a 360-degree oriented view for display.

7. The system as claimed in claim 6, wherein the selector:
   accesses a metadata file, the metadata file comprising information of multiple view orientations and corresponding view for each view orientation; and
   selects the view corresponding to the view orientation which is closest to the view point of the user.

8. The system as claimed in claim 6 and further comprising:

a synchronizer to synchronize the view independent stream and the first view dependent stream.

9. The system as claimed in claim 6 and further comprising:
a display for displaying the 360-degree oriented view.

10. The system as claimed in claim 6, wherein:
the selector further selects a second view dependent stream, wherein the view independent stream and the second view dependent stream have at least one different geometry;
the view generator further generates end user views corresponding to the view independent stream and the second view dependent stream; and
the blender further blends the end user views to generate a view for display.

11. A method for generating multiple video streams at a server, the method comprising:
receiving an input video stream;
generating a view independent stream, representing a background video stream, from the input video stream;
generating a first view dependent stream, representing a foreground video stream, using the input video stream and the view independent stream for a first viewpoint, wherein the view independent stream and the first view dependent stream have at least one different geometry, and wherein the view independent stream has a higher field of view than the first view dependent stream;
generating a metadata file, the metadata file comprising information of the first viewpoint and corresponding view of the first view dependent stream; and
storing the view independent stream, the first view dependent stream, and the metadata file.

12. The method as claimed in claim 11, wherein generating the view independent stream comprises:
converting equirectangular input video stream into cubemap stream; and
encoding the cubemap stream to generate the view independent stream.

13. The method as claimed in claim 11, wherein generating the first view dependent stream comprises:
performing view adaptive rotation on the input video stream;
converting rotated input video stream into a first trapezoid stream;
performing view adaptive rotation on the view independent stream;
converting rotated view independent stream into a second trapezoid stream;
processing the first trapezoid stream and the second trapezoid stream using a function; and
encoding the processed stream to generate the view dependent stream.

14. The method as claimed in claim 11 and further comprising:
generating a second view dependent stream using the input video stream and the view independent stream for a second viewpoint, wherein the independent view stream and the second view dependent stream have at least one different geometry; and
updating the metadata file with the second view point and corresponding view of the second view dependent stream.

15. A system for generating multiple video streams, the system comprising:
a receiver to receive an input video stream;
an independent view generator to generate a view independent stream, representing a background video stream, from the input video stream;
a dependent view generator to:
generate a first view dependent stream, representing a foreground video stream, using the input video stream and the view independent stream for a first viewpoint, wherein the view independent stream and the first view dependent stream have at least one different geometry, and wherein the view independent stream has a higher field of view than the first view dependent stream, and
generate a metadata file, the metadata file comprising information of first viewpoint and corresponding view of the first view dependent stream; and
a storage device to store the view independent stream, the first view dependent stream, and the metadata file.

16. The system as claimed in claim 15, wherein the independent view generator:
converts equirectangular input video stream into cubemap stream; and
encodes the cubemap stream to generate the view independent stream.

17. The system as claimed in claim 15, wherein the dependent view generator:
performs view adaptive rotation on the input video stream;
converts rotated input video stream into a first trapezoid stream;
performs view adaptive rotation on the view independent stream;
converts rotated view independent stream into a second trapezoid stream; and
processes the first trapezoid stream and the second trapezoid stream using a function; and
encodes the processed stream to generate the view dependent stream.

18. The system as claimed in claim 17, wherein the dependent view generator further:
generates a second view dependent stream using the input video stream and the view independent stream for a second viewpoint, wherein the independent view stream and the second view dependent stream have at least one different geometry; and
updating the metadata file with the second viewpoint and corresponding view of the second view dependent stream.

* * * * *